(12) United States Patent
Tominaga et al.

(10) Patent No.: US 7,299,767 B2
(45) Date of Patent: Nov. 27, 2007

(54) HOUSING FOR SMALL PET ANIMALS

(75) Inventors: Kazutoshi Tominaga, Higashiosaka (JP); Robert C. Krause, Arlington Heights, IL (US); Hikaru Nakagawa, Higashiosaka (JP); Kozo Sakai, Kurume (JP); Keqian You, Zhejiang (CN)

(73) Assignee: Kabushiki Kaisha Tominaga Jyushi Kogyosho, Higashiosaka-shi (JP)

( * ) Notice: Subject to any disclaimer, the term of this patent is extended or adjusted under 35 U.S.C. 154(b) by 284 days.

(21) Appl. No.: 11/061,784

(22) Filed: Feb. 22, 2005

(65) Prior Publication Data

US 2005/0211184 A1    Sep. 29, 2005

(30) Foreign Application Priority Data

Feb. 26, 2004    (JP)    ............... 2004-051953

(51) Int. Cl.
*A01K 15/02* (2006.01)
*A01K 1/03* (2006.01)

(52) U.S. Cl. ...................... 119/700; 119/421

(58) Field of Classification Search ............... 119/700, 119/421, 452, 482, 703, 702, 704, 29; 482/78; 446/236
See application file for complete search history.

(56) References Cited

U.S. PATENT DOCUMENTS

| | | | |
|---|---|---|---|
| 3,788,277 A * | 1/1974 | Willinger et al. ........... | 119/700 |
| 4,300,479 A * | 11/1981 | Demko ....................... | 119/427 |
| 5,088,446 A * | 2/1992 | Campiotti .................... | 119/421 |
| 5,186,122 A * | 2/1993 | Phillips et al. .............. | 119/474 |
| 5,649,503 A * | 7/1997 | Woolfolk ..................... | 119/700 |
| 6,032,614 A * | 3/2000 | Tominaga .................... | 119/452 |
| 6,412,443 B1 * | 7/2002 | Miller ........................ | 119/704 |
| D484,284 S * | 12/2003 | Venson et al. ............. | D30/160 |

* cited by examiner

*Primary Examiner*—Rob Swiatek
(74) *Attorney, Agent, or Firm*—Kratz, Quintos & Hanson, LLP

(57) ABSTRACT

A housing for small pet animals includes a pedestal portion 1, a fixing side plate 3 uprightly attached to the pedestal portion 1, an activity wheel 5 with one side opened toward the fixing side plate 3 and the other side closed by closing members 52c. The wheel 5 is disposed above the pedestal portion 1 with the one side closed by the fixing side plate 3. The housing further includes a housing equipment immovably attached to the fixing side plate 3 and disposed in a housing space surrounded by the fixing side plate 3 and the activity wheel 5.

17 Claims, 15 Drawing Sheets

HOUSING FOR SMALL PET ANIMALS

This application claims priority under 35 U.S.C. § 119 to Japanese Patent Application No. P2004-51953 filed on Feb. 26, 2004, the entire disclosure of which is incorporated herein by reference in its entirety.

BACKGROUND OF THE INVENTION

1. Field of the Invention

The present invention relates to a housing for small pet animals. More specifically, it relates to a housing for keeping small pet animals such as hamsters or squirrels for the purpose of breeding or raising them.

2. Description of the Background

The following description sets forth the inventor's knowledge and should not be construed as an admission that the description constitutes prior art.

In keeping small pet animals such as hamsters or gerbils, a box-shaped mesh cage is commonly used. In this case, in addition to a feed box, a nest box and another housing equipments, an activity wheel (which is also referred to as "racing wheel" or "exercise wheel"; hereinafter may be simply referred to as "wheel") is disposed for their exercises and enjoyments.

One of the most interesting things for hamster breeders is to watch the hamster's activity using the wheel.

Thus, it is preferably to employ a larger wheel to enjoy watching hamster's activity using the wheel. Such a larger wheel, however, occupies a larger space in the casing, causing a decreased housing space. Accordingly, it is difficult to employ such a large-sized activity wheel in a casing unless employing smaller housing equipments such as a smaller feeding box and a smaller nest box.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a housing for small pet animals, such as hamsters, capable of employing a larger activity wheel while keeping a sufficient housing space.

Among other potential advantages, some embodiments can provide a housing for small pet animals, such as hamsters, suitable for observing their activity using an activity wheel.

According to a first aspect of a preferred embodiment of the present invention, a housing for small pet animals, includes:

a pedestal portion;

a fixing side plate uprightly attached to the pedestal portion;

an activity wheel with one side opened toward the fixing side plate and the other side closed by a closing member, the wheel being rotatably disposed above the pedestal portion with the one side closed by the fixing side plate; and a housing equipment immovably attached to the fixing side plate and disposed in a housing space surrounded by the fixing side plate and the activity wheel.

In this housing, since the housing equipment is immovably attached to the fixing side plate and disposed in a housing space surrounded by the fixing side plate and the activity wheel, the wheel can be rotated without being prevented by the housing equipment. Accordingly, a larger wheel can be employed without reducing the side of housing equipments. Furthermore, since the housing equipment is attached to the fixing side plate, feeding or the like can be performed without stopping the rotation of the wheel.

It is preferable that the activity wheel includes a pair of side frames disposed in parallel with each other at a certain distance, a cylindrical peripheral member disposed between the pair of side frames and connected thereto, and a revolving shaft with one end portion thereof connected to one of the pair of the side frames.

It is preferable that the cylindrical peripheral member is a net-shaped member or a lattice-shaped member.

It is preferable that one of the pair of side frames includes a circular peripheral rim, radially extending spokes, and transparent members for closing openings surrounded by the peripheral rim and the spokes.

It is preferable that the wheel is provided with a revolving shaft with one end portion thereof rotatably supported by the fixing side plate and the other end portion thereof rotatablly supported by a wheel supporting stand attached to the pedestal portion.

It is preferable that the supporting member is a support roller inwardly protruded from the fixing side plate so as to be brought into contact with an inner peripheral surface of the wheel.

It is preferable that the fixing side plate is provided with a first opening for connecting a connecting tube to be disposed at an outside of the housing.

It is preferable that the fixing side plate is provided with a second opening for connecting a passage tube to be disposed at an outside of the housing.

It is preferable that the pedestal portion is provided with a slidable tray.

It is preferable that the housing equipments include a stage on which breeding equipments are to be disposed.

It is preferable that the stage is provided with hooks to be engaged with hooking apertures formed in the fixing side plate and supporting ledges to be brought into contact with an inner surface of the fixing side plate in a state in which the supporting ledges are engaged with the hooking apertures.

According to a second aspect of a preferred embodiment of the present invention, a housing for small pet animals, includes:

a drum-shaped rotatable main housing with one opened side;

a vertical side member which closes the one opened side of the drum-shaped main housing; and a housing equipment immovably attached to an inside surface of the side member, whereby the drum-shaped rotatable main housing is capable of being rotated about a horizontal axis thereof by small pet animals.

In this housing, since the housing equipment is immovably attached to the inside surface of the side member and the drum-shaped rotatable main housing is capable of being rotated about a horizontal axis thereof by small pet animals, a larger wheel can be employed without reducing the side of housing equipment. Furthermore, since the housing equipment is attached to the fixing side plate, feeding or the like can be performed without stopping the rotation of the wheel.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
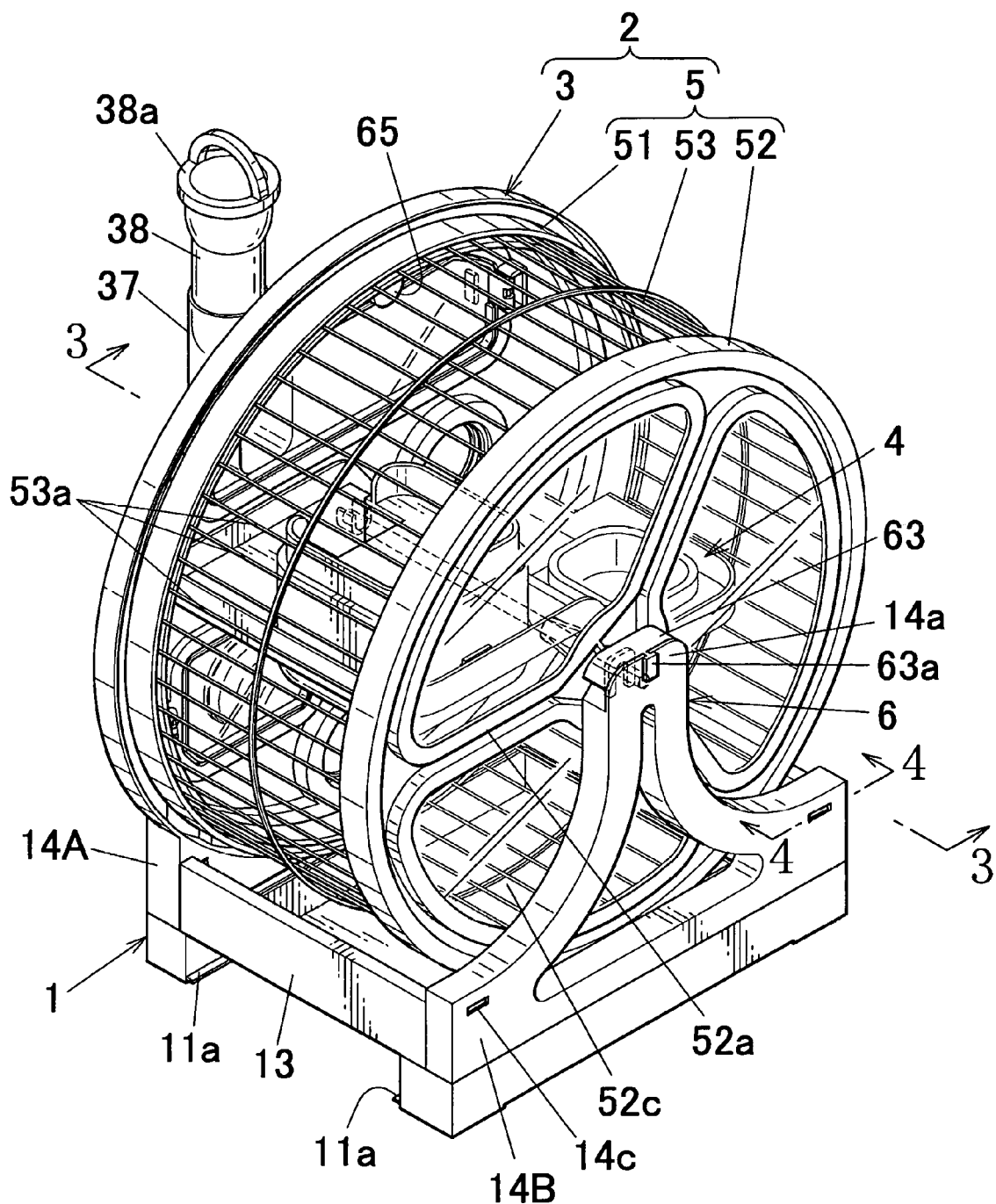
FIG. 1 is a perspective view showing a housing for small pet animals according to an embodiment of the present invention.
Figure 2:
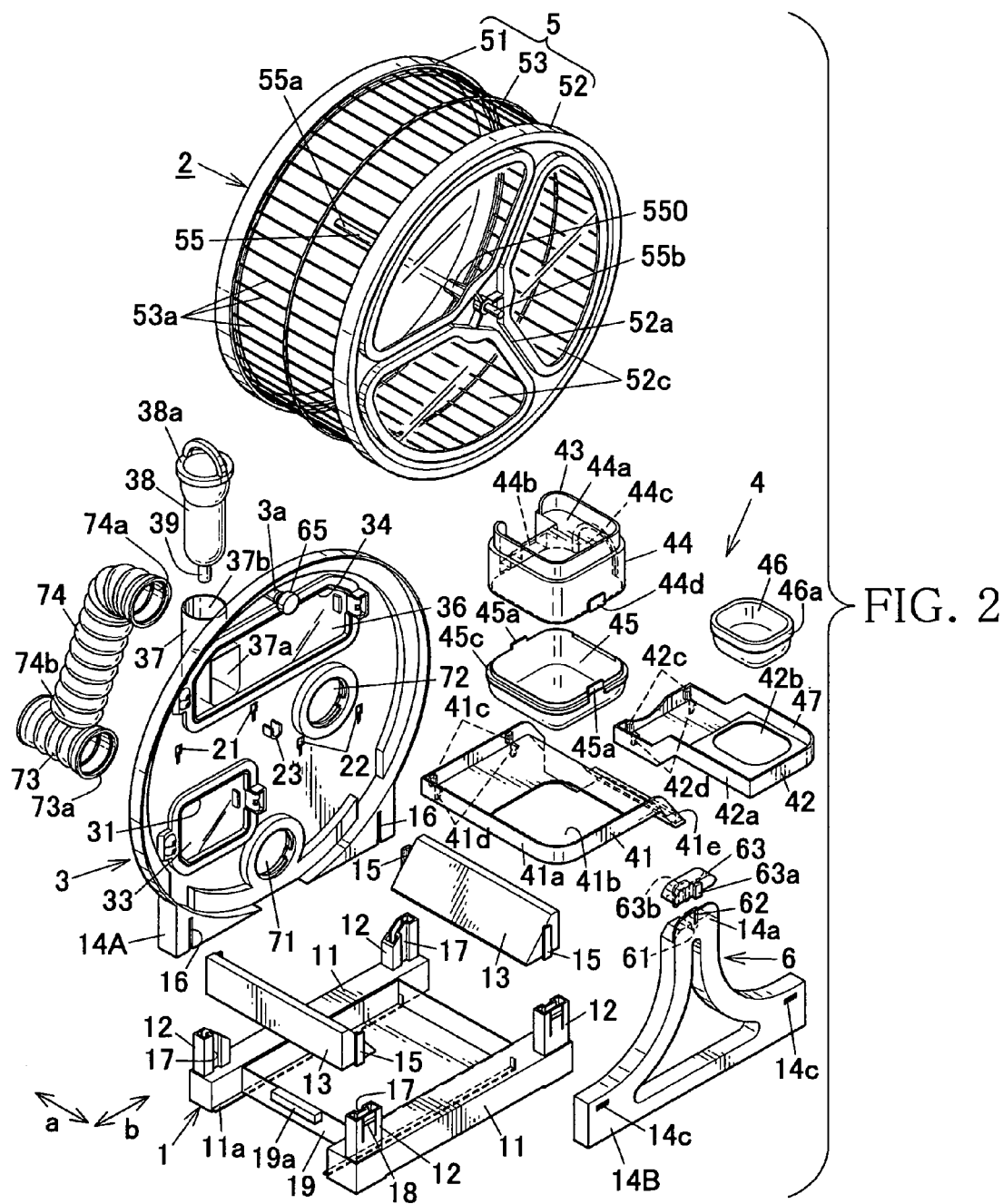
FIG. 2 is an exploded perspective view of the aforementioned housing for small pet animals.
Figure 3:
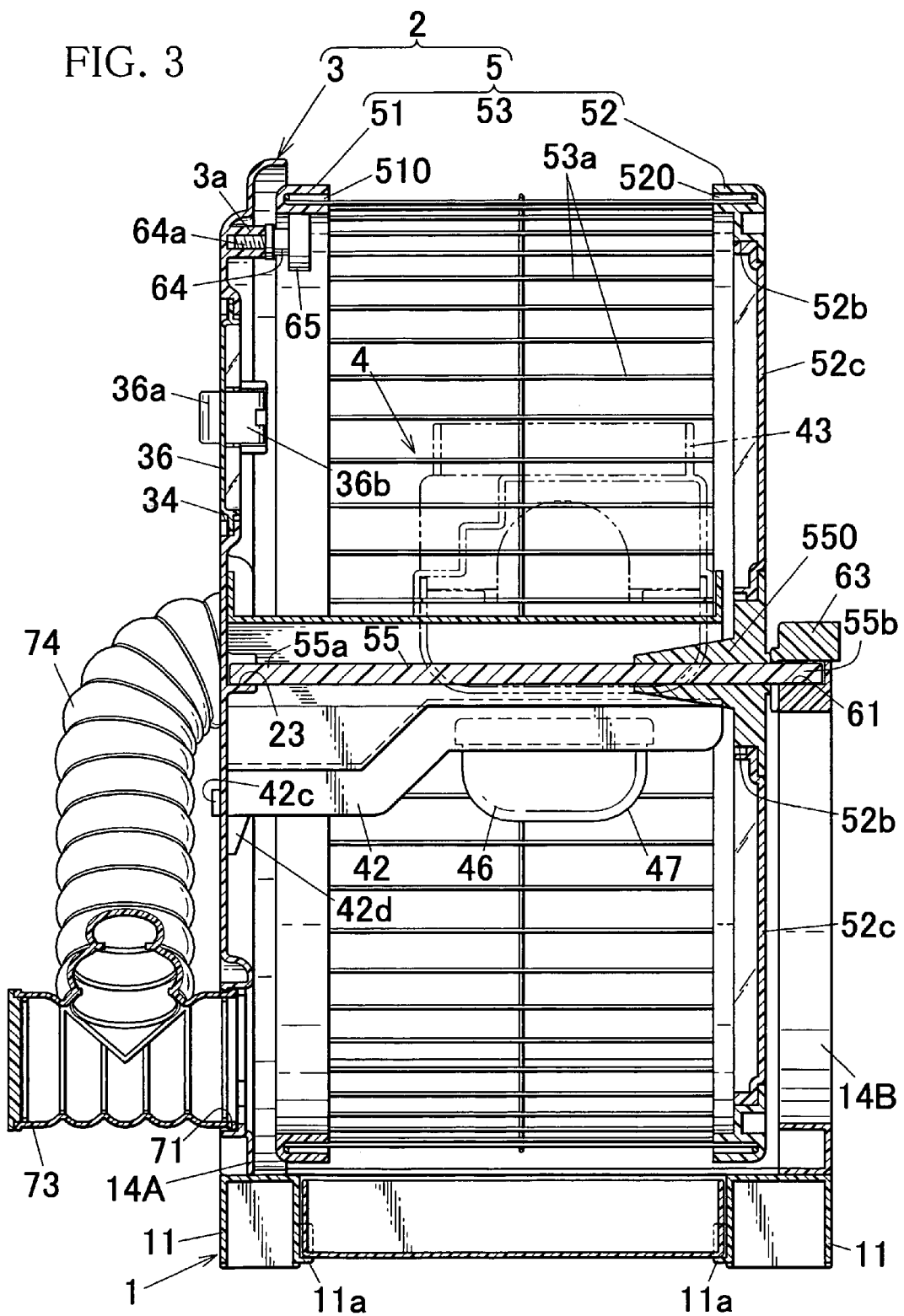
FIG. 3 is a cross-sectional view taken along the line 3-3 in FIG. 1.

FIG. 1 shows a perspective view showing a housing for small pet animals according to an embodiment of the present invention, FIG. 2 shows an exploded view of the housing, and FIG. 3 is a cross-sectional view taking along the line 3-3 in FIG. 1. In this disclosure, the following explanation will be directed to a housing for keeping hamsters. However, it should be understood that the present invention can also be applied to a housing for keeping another small pet animals including squirrels and gerbils for example.

As shown in FIGS. 1 to 3, as main components, this housing for hamsters includes a pedestal portion 1, a cage 2, a fixing side plate 3, housing equipments 4, an activity wheel 5, and a wheel supporting stand 6.

The pedestal portion 1 includes a pair of right and left synthetic resin base members 11 and 11 disposed at a certain distance in the right-and-left direction (the direction of the arrow "a" shown in FIG. 2), front and rear synthetic resin pillars 12 and 12 uprightly protruded from longitudinal ends of each base member 11, and a pair of front and rear synthetic resin connecting members 13 and 13 each for connecting the corresponding pillars 12 and 12 of the right and left base members 11 and 11.

The front and rear pillars 12 and 12 of the left base member 11 are inserted into the opened lower ends formed in the lower end of the left bracket 14A provided at the lower end of the fixing side plate 3. Similarly, the front and rear pillars 12 and 12 of the right base member 11 are inserted into the opened lower ends formed in the lower end of the right bracket 14B provided at the lower end of the wheel supporting stand 6. The aforementioned right and left brackets 14A and 14B can be provided with an embedded reinforcing member, respectively.

At each of the longitudinal end surfaces of the connecting member 13, a connecting ledge 15 in the form of a T-shaped cross-section is formed. For fitting each connecting ledge 15, as shown in FIG. 4, a vertical slit 16 with an opened lower end is formed at the corresponding inner side wall of each of the right and left bracket 14A and 14B.

Figure 4:
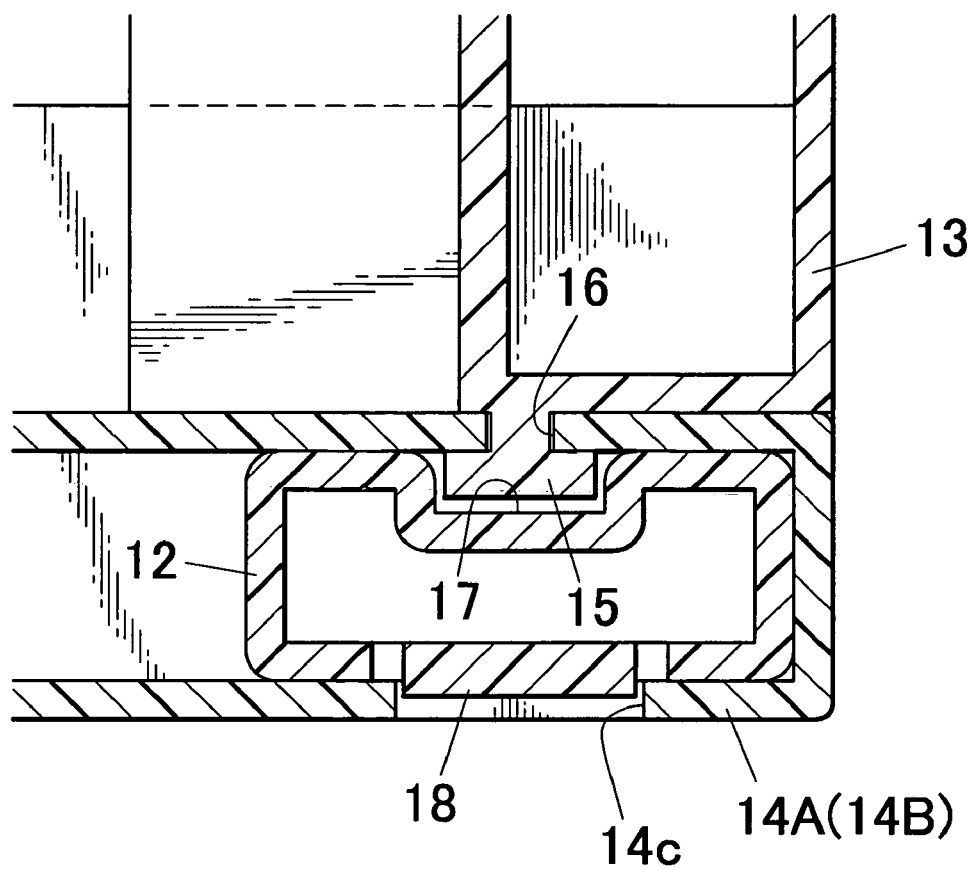
FIG. 4 is an enlarged cross-sectional view taken along the line 4-4 in FIG. 1.

At the inner surface side (opposed side) of each pillar 12, as best shown in FIG. 4, a vertically extending groove 17 is formed so that the T-shaped connecting ledge 15 fitted in the vertical slit 16 of the bracket 14A(14B) can be accommodated therein in a state in which the pillar 12 is inserted into the opened lower end of the bracket 14A(14B).

Furthermore, at the outer surface side of each pillar 12, an elastic engaging ledge 18 for securing an engagement between the pillar 12 and the bracket 14A(14B) is provided. Thus, the tip end protrusion of the engaging ledge 18 can be elastically engaged with an aperture 14c of the bracket 14A(14B) at the time of fitting the pillar 12 into the opened lower end of the bracket 14A(14B).

As shown in FIG. 2, at the inner side surface (opposed side surface) of each base member 11, a guide rail 11a is provided along the longitudinal direction thereof, so that a tray 19 can be slidably supported by the guide rails 11a and 11a.

As best shown in FIG. 2, the aforementioned fixing side plate 3 is formed into a round plate-shape member made of, for example, synthetic resin. At the lower end thereof, the aforementioned left bracket 14A is integrally provided.

This fixing side plate 3 is provided with an opening 31 for taking small pet animals such as hamsters in and out. This opening 31 is closed openably by a transparent first door 33 made of synthetic resin with a hinge portion 32 (see FIG. 6).

Figure 6:
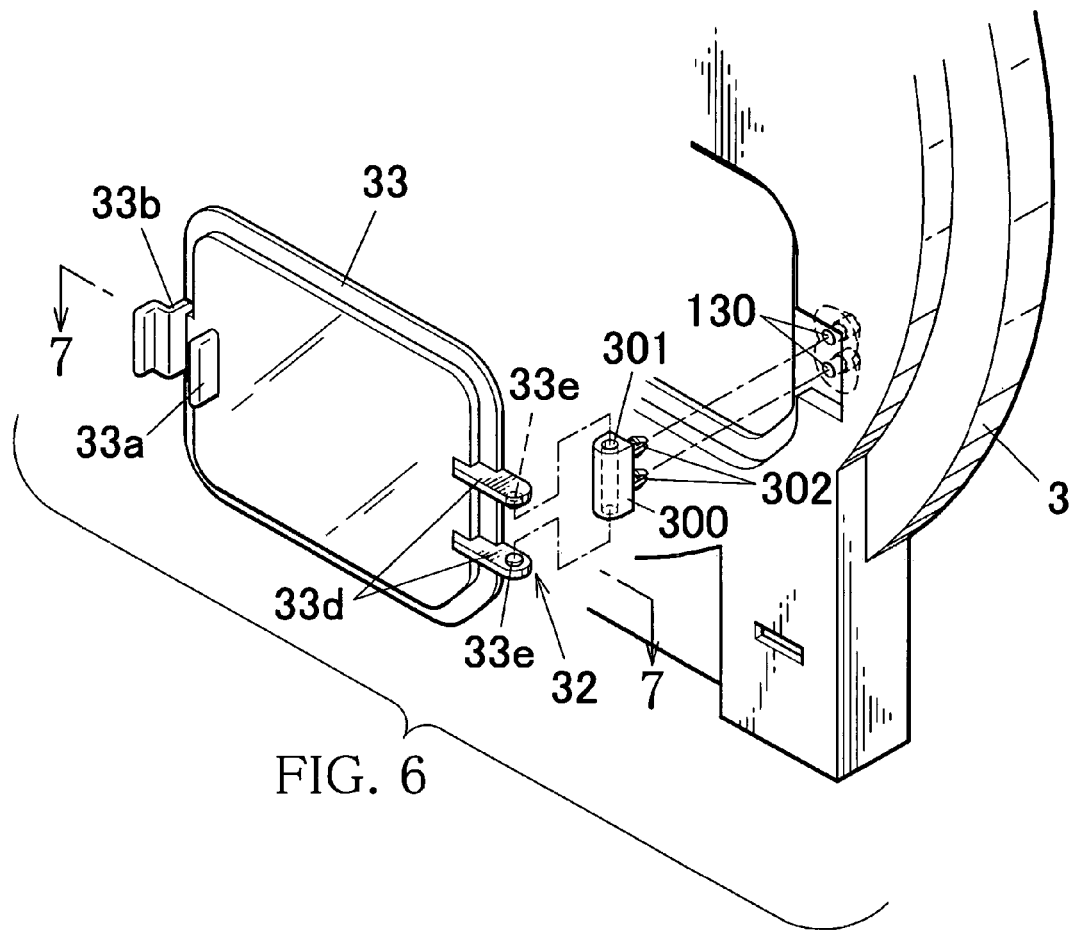
FIG. 6 is a perspective view showing a first door and its hinge portion.
Figure 7:
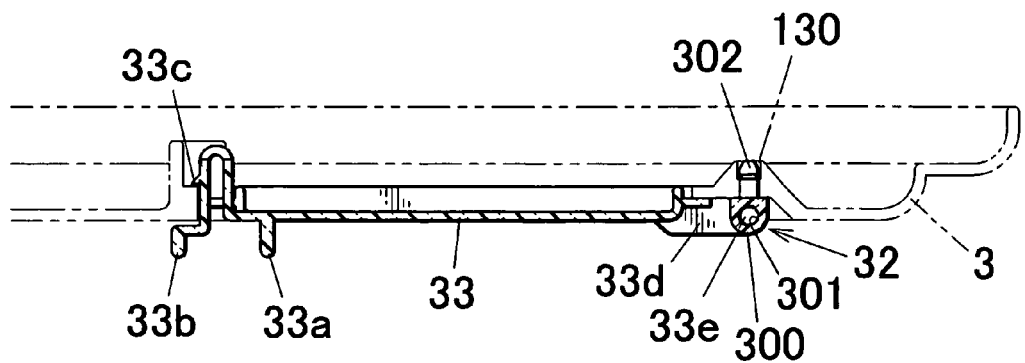
FIG. 7 is a cross-sectional view taken along the line 7-7 in FIG. 6.

As shown in FIGS. 6 and 7, at the free end portion of the first door 33, a knob 33a for operating the door is outwardly protruded. At the edge of the free end portion, an inwardly dented U-shaped elastic ledge 33b is integrally formed. This elastic ledge 33b is integrally provided with an engaging portion 33c to be moderately engaged with the inner peripheral edge of the opening 31 at the time of closing the first door 33. The opening and closing operation of the first door 33 can be performed by pinching the elastic ledge 33b and the knob 33a, and the locking and unlocking of the door can be performed by elastically bending the elastic ledge 33b.

At the basal end portion of the first door 33, as shown in FIG. 6, a pair of upper and lower opposing ledges 33d and 33d are provided. On each of the opposed surfaces of these ledges 33d and 33d, a pin 33e is formed as a shaft. These pins 33e and 33e are fitted in ends of a shaft hole 301 of a first shaft bush 300 fixed to the fixing side plate 3. Thus, these pins 33e and 33e and the first shaft bush 300 constitute the aforementioned hinge portion 32.

Figure 9:
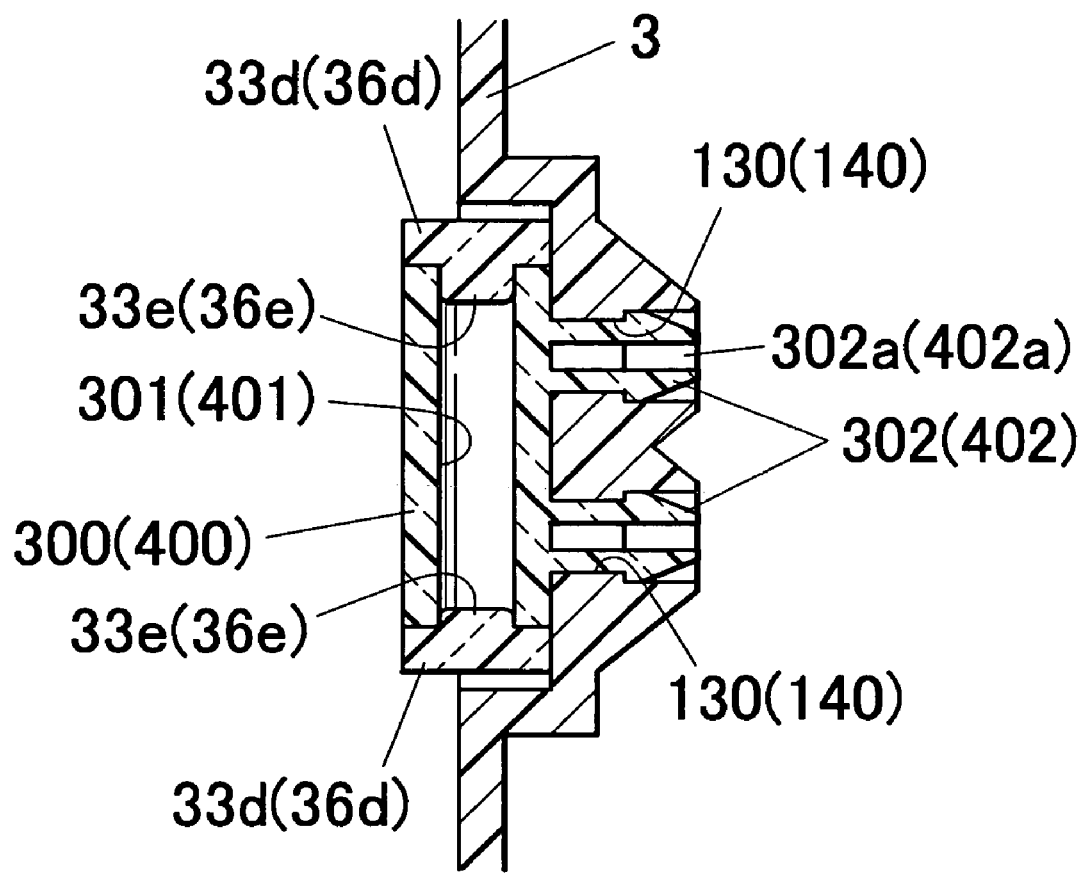
FIG. 9 is a cross-sectional view showing the hinge portion of the first (second) door.

As shown in FIG. 9, the first shaft bush 300 is integrally provided with a pair of upper and lower engaging protrusions 302 and 302 each having a slotted portion 302a. When the engaging protrusions 302 and 302 are inserted into the engaging apertures 130 and 130 formed in the fixing side plate 3, each engaging protrusion 302 is elastically decreased in diameter due to the slotted portion 302a to be engaged with the engaging aperture 130.

Returning to FIG. 2, the fixing side plate 3 is provided with a feeding opening 34 located above the first opening 31. This feeding opening 34 is closed by a synthetic resin transparent second door 36 in an openable and closable manner with the basal end hinged by a hinge portion 35 (see FIG. 8).

Figure 8:
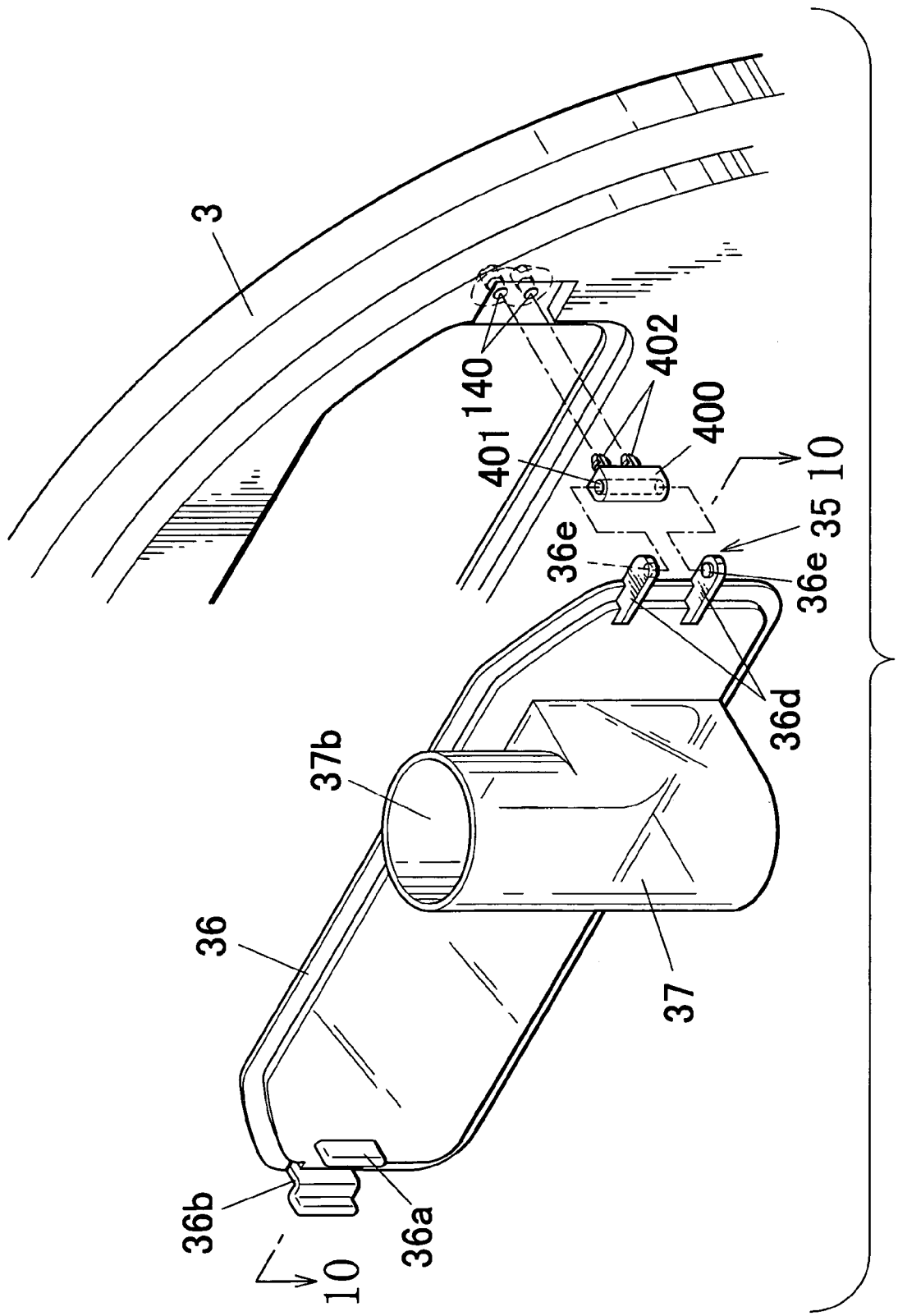
FIG. 8 is a perspective view showing a second door and its hinge portion.
Figure 10:
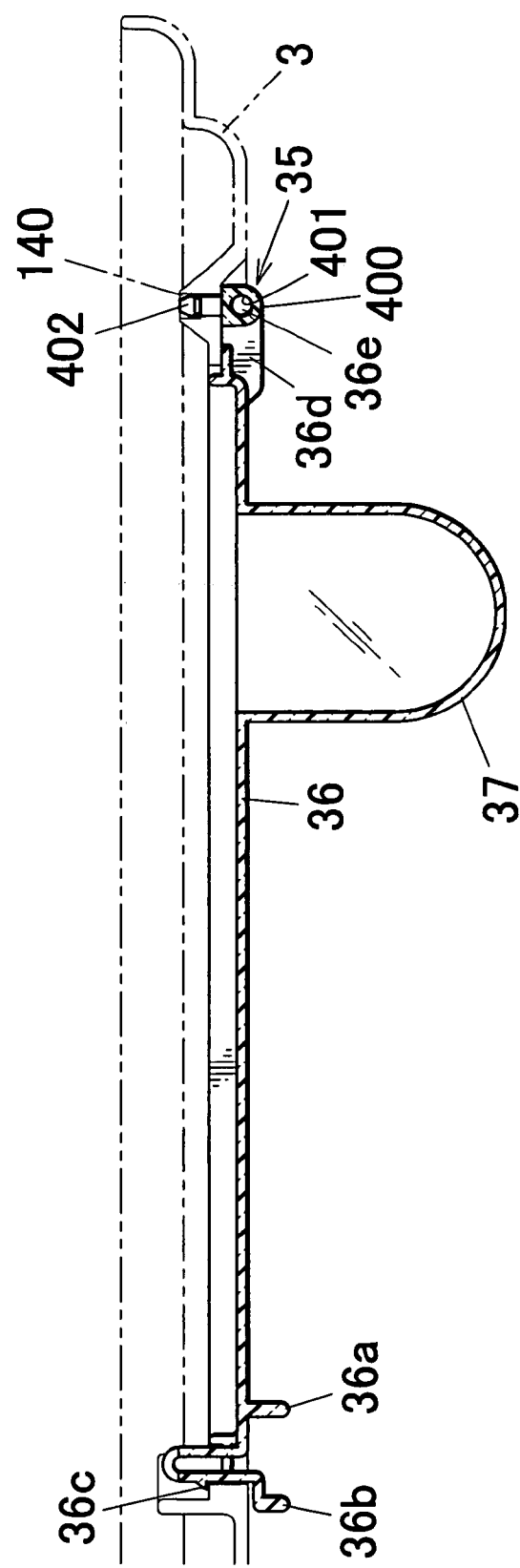
FIG. 10 is a cross-sectional view taken along the line 10-10 in FIG. 8.

Similar to the first door 33, as shown in FIGS. 8 and 10, at the free end portion of this second door 36, a knob 36a for operating the door is outwardly protruded. At the edge of the free end portion, an inwardly dented U-shaped elastic ledge 36b is integrally formed. This elastic ledge 33b is integrally provided with an engaging portion 36c to be moderately engaged with the inner peripheral edge of the feeding opening 34 at the time of closing the second door 36. The opening and closing operation of the second door 36 can be performed by pinching the elastic ledge 36b and the knob 36a, and the locking and unlocking of the door 36 can be performed by elastically bending the elastic ledge 36b.

At the basal end portion of the first door 33, as shown in FIG. 8, a pair of upper and lower opposing ledges 36d and 36d are provided. On each of the opposed surfaces of these ledges 36d and 36d, a pin 36e is formed as a shaft. These pins 36e and 36e are fitted in the ends of a shaft hole 401 of a second shaft bush 400 fixed to the fixing side plate 3. Thus, these pins 36e and 36e and the second shaft bush 400 constitute the aforementioned hinge portion 35.

As shown in FIG. 9, the second shaft bush 400 is integrally provided with a pair of upper and lower engaging protrusions 402 and 402 each having a slotted portion 402a. When the engaging protrusions 402 and 402 are inserted into the engaging apertures 140 and 140 formed in the fixing side plate 3, each engaging protrusion 402 is elastically decreased in diameter due to the slotted portion 402a to be engaged with the engaging aperture 140.

An L-shaped tubular water-feeder receptor 37 is attached on the external surface of the second door 36 with a lower opened end 37a of the receptor communicated with the inner side space of the fixing plate 3. From the upper opened end 37b, a water-feeder 38 having a cap 38a with a grip at the upper end and a water outlet 39 at the lower end is inserted in the receptor 37 in a removable manner. The aforementioned lower opened end 37a is formed to have such a size that hamsters can enter to sip water via the water outlet 39.

The fixing position of the water-feeder receptor 37 is not limited to the second door 36, and can be any portion so long as hamsters can reach.

The second door 36 can be fixed at any position of the fixing side plate 3 other than the second door 36.

The housing equipments 4 include, for example, a first stage 41, a second stage 42, a nest 43 and a feeder 47.

The first stage 41 is attached to the fixing side plate 3 with the left side thereof located below the feeding opening 34. The first stage 41, which is made of resin for example, is provided with a surrounding wall 41a extending along the front, right and left sides thereof. At the right side of the bottom wall, a nest fitting opening 41b is formed. Furthermore, the rear side of the first stage 41 is formed into a downslope constituting a passage between the first stage 41 and the second stage 42.

Figure 11:
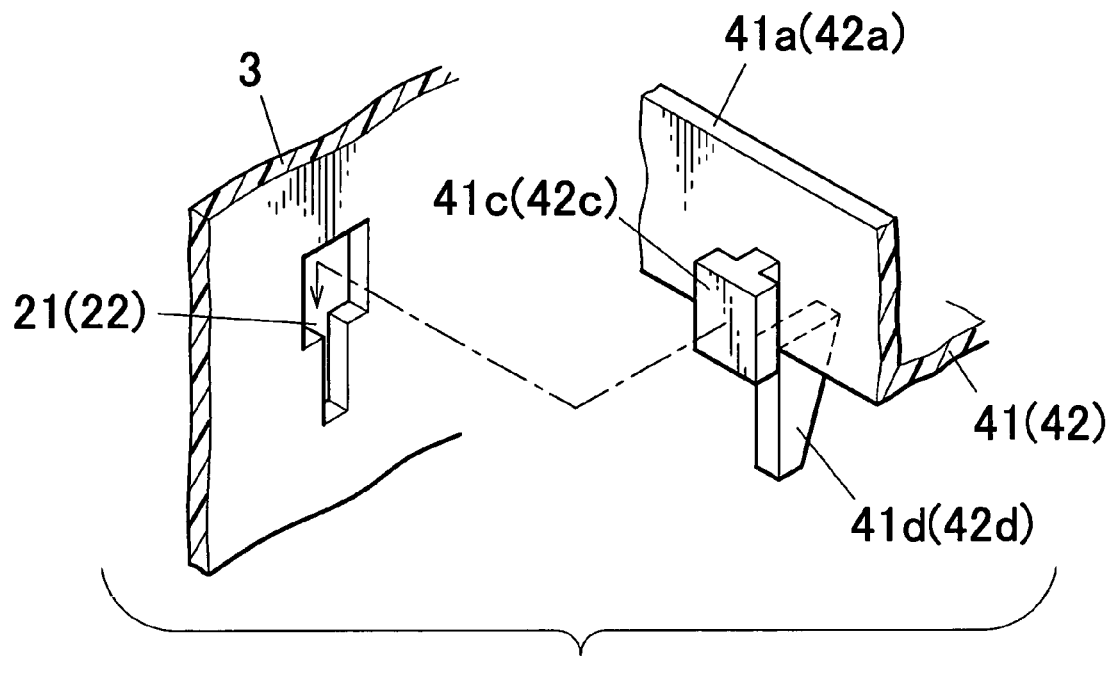
FIG. 11 is an exploded perspective view of the engaging portions of the fixing side plate and the first (second) stage.
Figure 12:
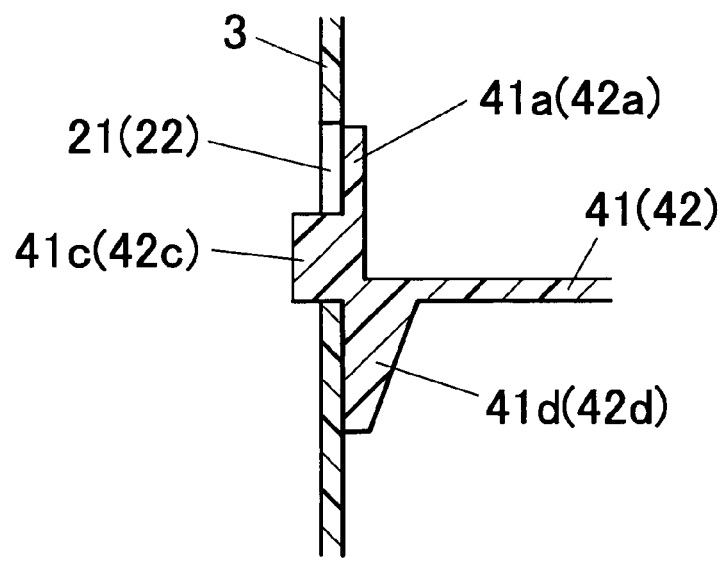
FIG. 12 is a cross-sectional view showing the engaged state of the fixing side plate and the first (second) stage.

At the left side surface of the first stage 41, as shown in FIGS. 11 and 12, a pair of front and rear T-shaped hooks 41c and 41c are integrally formed. These hooks 41c and 41c are inserted into the corresponding T-shaped hooking apertures 21 and 21 formed in the fixing side plate 3 to be hooked on the fixing side plate 3. Further, the first stage 41 is integrally provided with a pair of front and rear supporting ledges 41d and 41d to secure the stable engagement of the hooks 41c and 41c by coming into contact with the inner surface of the fixing side plate 3.

Figure 19:
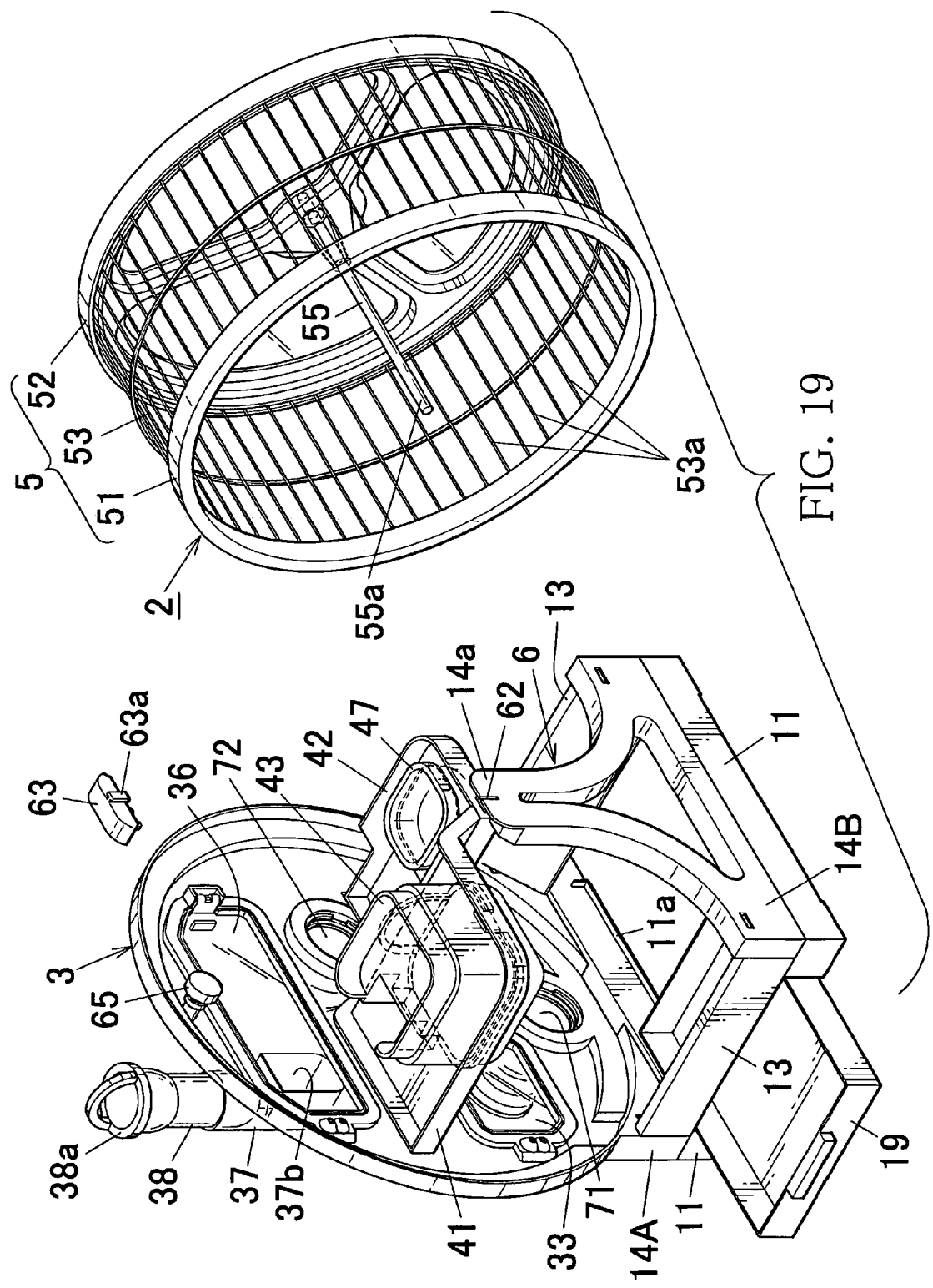
FIG. 19 is a perspective view showing the housing for small pet animals in which the activity wheel is detached from the fixing side plate.
Figure 20:
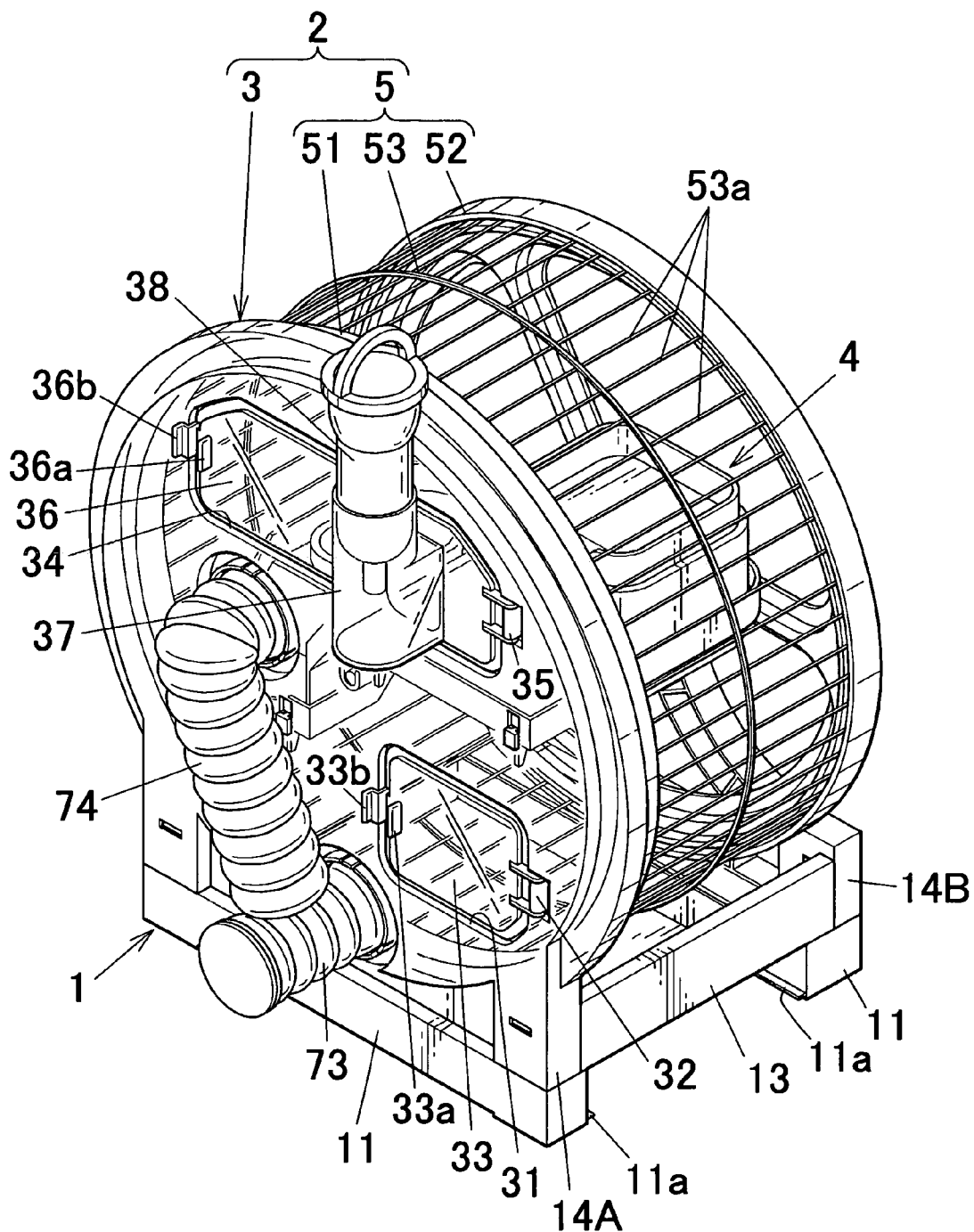
FIG. 20 is a perspective view showing the housing for small pet animals in an assembled state.

As shown in FIG. 19, the second stage 42 is positioned lower than the first stage 41 at the rear side of the first stage 41. As shown in FIG. 2, this second stage 42 is made of synthetic resin for example, and is provided with a surrounding wall 42a along the entire periphery. In the right side higher stepped region, an aperture 42b for fitting a feeding tray 46 is formed.

The feeding tray 46 is provided with a thick upper rim 46a extending along the entire external periphery of the tray 46 so that the tray 46 can be supported in the aperture 42b with the rim 46a engaged with the opening edge of the aperture 42b. The feeding tray 46 and the second stage 42 constitute the aforementioned feeder 47.

At the left side surface of this second stage 42, the same engaging structure as in the aforementioned first stage 41 is employed. That is, as shown in FIG. 11, a pair of front and rear T-shaped hooks 42c and 42c are integrally formed at the left side surface of the second stage 42. These hooks 42c and 42c are inserted into the corresponding T-shaped hooking apertures 22 and 22 formed in the fixing side plate 3 to be hooked on the fixing side plate 3. Further, the second stage 42 is integrally provided with a pair of front and rear supporting ledges 42d and 42d to secure the stable engagement of the hooks 42c and 42c by coming into contact with the inner surface of the fixing side plate 3.

Figure 13:
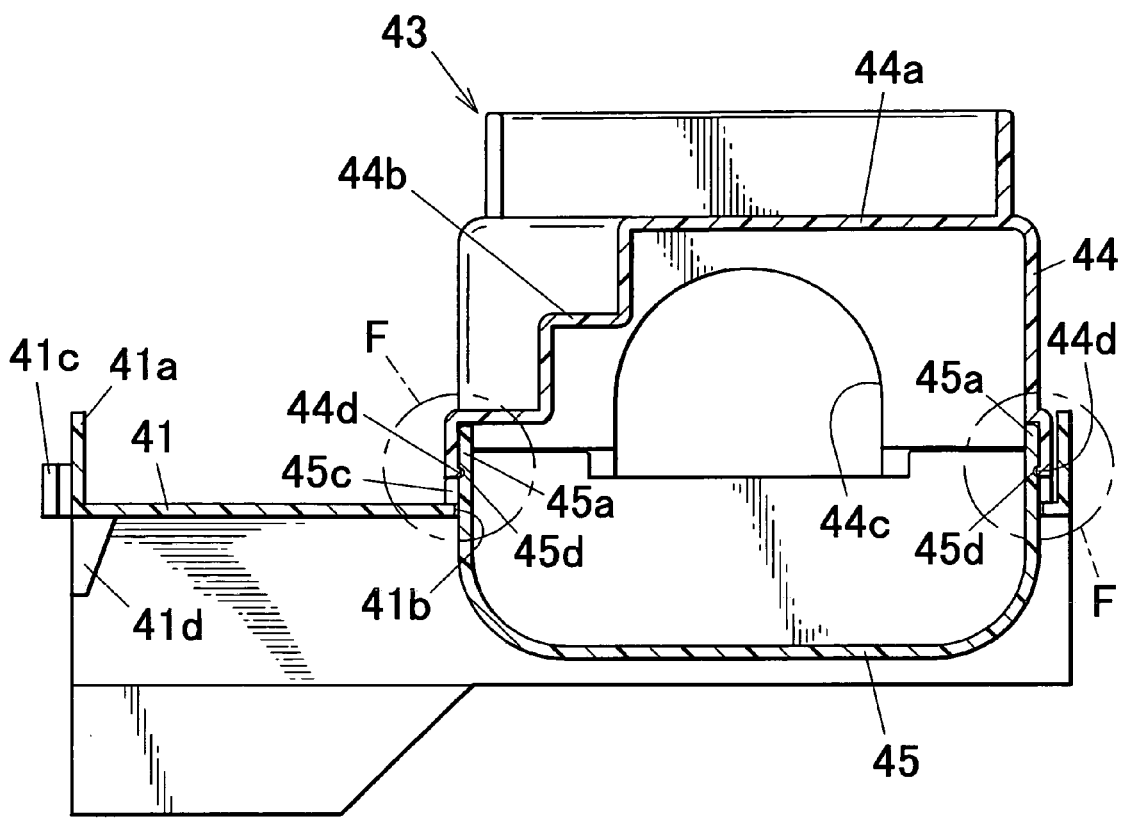
FIG. 13 is a cross-sectional view showing an assembled nest.
Figure 14:
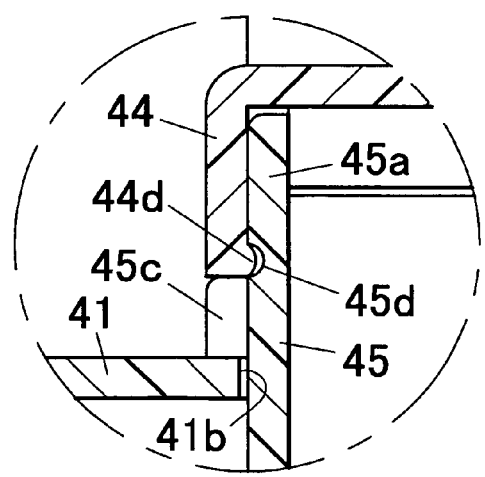
FIG. 14 is an enlarged cross-sectional view of the circled portion F in FIG. 13.

As shown in FIGS. 13 and 14, the aforementioned nest 43 consists of a nest main body 44 having upper and lower opened ends and a floor portion 44a formed at the upper side thereof and a sleeping room forming bottom member 45 detachably attached to the lower opened end of the nest main body 44.

As shown in FIG. 13, the nest main body 44 has stairs 44*b* leading to the floor portion 44*a* at the left side of the nest main body 44. Furthermore, an opening 44*c* for allowing hamsters to go in and out the bottom member 45 is formed in the rear wall of the nest main body 44 so as to be located below the floor portion 44*a*.

As shown in FIG. 14, at the upper opened end portion of the bottom member 45, right and left upwardly protruded ledges 45*a* and 45*a* each having an engaging dented portion 45*d* are integrally formed. Furthermore, at the lower opened end portion of the nest main body 44, elastic ledges 44*d* and 44*d* are formed, so that these ledges 44*d* and 44*d* can be detachably engaged with the dented portions 45*d* and 45*d* when the nest main body 44 and the sleeping room forming bottom member 45 are coupled with each other.

The bottom member 45 is provided with a thick upper rim 45*c* extending along the entire external periphery of the bottom member 45 so that the nest 43 can be supported in the aperture 41*b* of the first stage 41 with the rim 45*c* engaged with the opening edge of the aperture 41*b*.

As shown in FIG. 2, the aforementioned activity wheel 5 includes a pair of right and left circular frames 51 and 52 made of synthetic resin for example, a cylindrical peripheral member 53 disposed between the circular frames 51 and 52, and revolving shaft 55. As shown in FIG. 1, this wheel 5 is disposed at the inner side of the fixing side plate 3, and constitutes a drum shaped cage 2 together with a wheel 5 surrounding the housing equipments 4.

Along the entire peripheral end portion of each of the opposed surfaces (inner surfaces) of the left and right frames 51 and 52, as shown in FIG. 3, a plurality of apertures 510 and 520 are formed. Into these apertures, the right and left end portions of the cylindrical peripheral member 53 are forcibly inserted. Thus, these three members 51, 52 and 53 are assembled to thereby form a lattice-type wheel 5 having a generally U-shaped cross-sectional shape. As mentioned above, since the wheel 5 is constituted by three separate members 51, 52 and 53, the die structure for molding each of these members can be simplified.

The right frame 52 is integrally provided with three radially extending spokes 52*a*, 52*a* and 52*a* (see FIG. 1). Each space 52*b* between the adjacent spokes 52*a* and 52*a* is covered by a synthetic transparent member 52*c*.

The cylindrical peripheral member 53 is formed into a cylindrical lattice shaped member having a number of bar-shaped members 53*a* disposed in parallel with each other so that hamsters can run on the inner surface thereof. However, the cylindrical peripheral member 53 can be formed by a mesh-like member.

The wheel 5 is not limited to the aforementioned structure, and can be a structure having a plurality of protrusions or steps formed on the entire interior surface so that hamsters can run. In such a case, however, the wheel 5 increases in weight and further it becomes hard to see the hamsters' activities in the wheel 5. In this regard, in cases where the cylindrical peripheral member 53 of the wheel 5 is a nest-like member or a lattice-like member, the entire weight can be decreased and that hamsters' activities in the wheel 5 can be easily observed.

Figure 15:
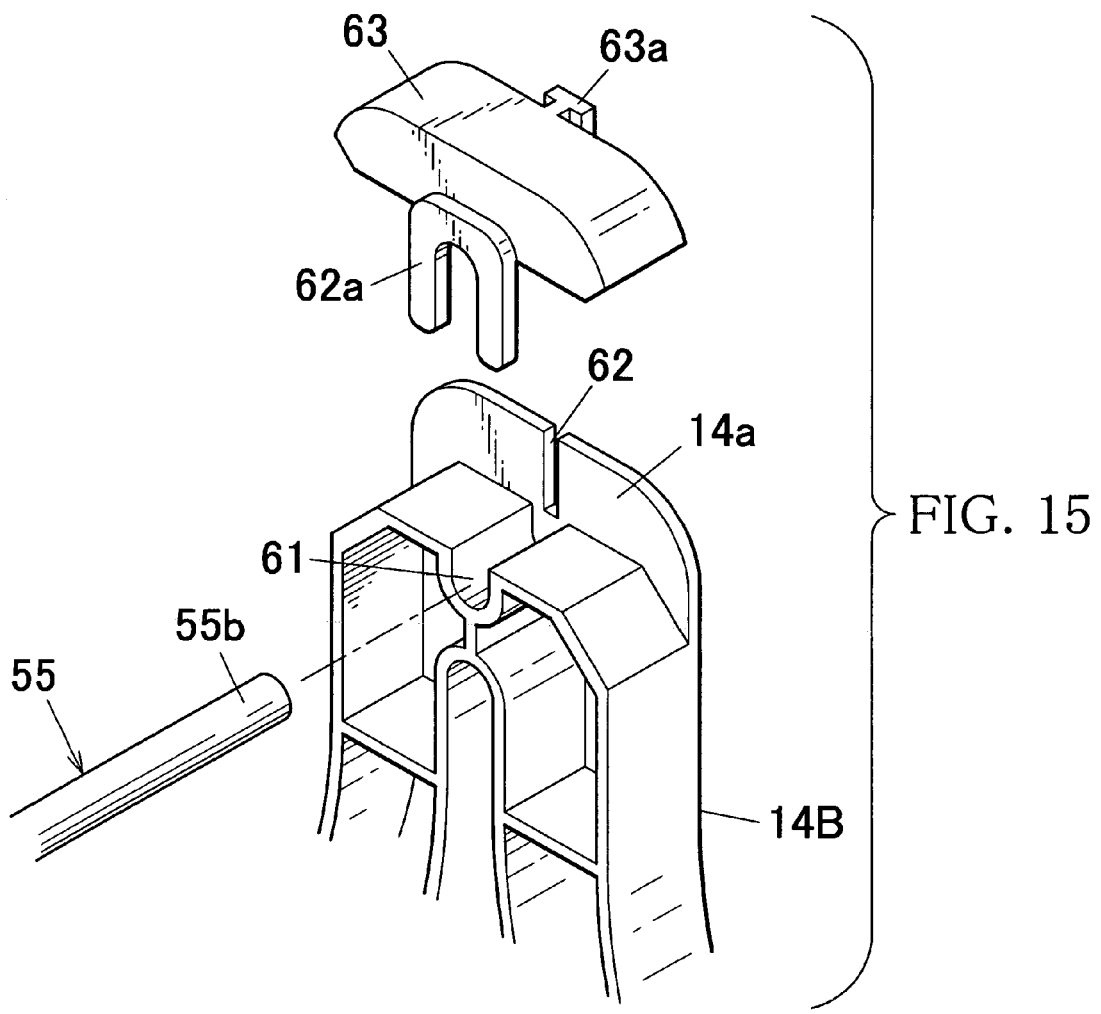
FIG. 15 is an exploded perspective view showing the supporting structure of an end of the revolving shaft of the activity wheel.
Figure 16:
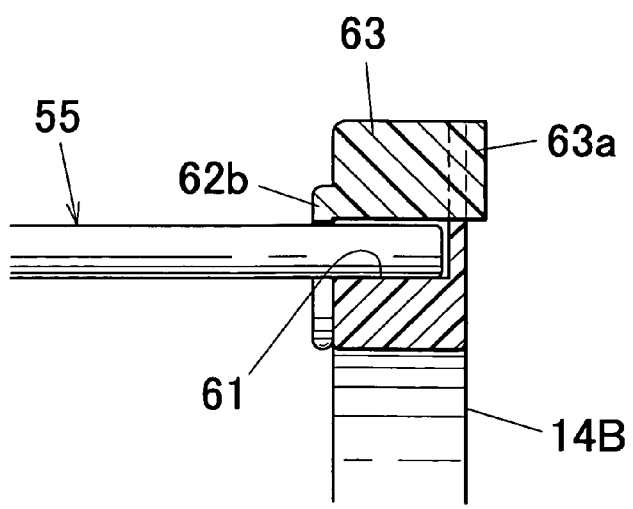
FIG. 16 is a cross-sectional view showing the supporting structure of the end of the revolving shaft of the activity wheel.

The revolving shaft 55 is fixed to the axial center of the right frame 52 via the hub 550 (see FIG. 2). The revolving shaft 55 extends below the first stage 41 to the inner surface side of the fixing side plate 3, and the left end portion 55*a* of this revolving shaft 55 is supported by the U-shaped shaft supporting portion 23 formed on the inner surface of the fixing side plate 3. As shown in FIGS. 15 and 16, the right end portion 55*b* of the revolving shaft 55 is fitted in and supported by a U-shaped shaft supporting portion 61 formed in the upper end surface of the right bracket 14B. Thus, the activity wheel 5 is roratably supported in a state in which the left side opening thereof is closed by the fixing side plate 3.

At the upper right end side of the right bracket 14B, as shown in FIGS. 15 and 16, an upright wall 14*a* having a vertical slit 62 is formed. Attached to the upper end of the right bracket 14B is a shaft cover 63 for covering the revolving shaft 55 fitted in the U-shaped supporting portion 61.

As shown in FIGS. 15 and 16, this shaft cover 63 has, at its right side, a T-shaped engaging portion 63*a* to be fitted in the vertical slit 62. Furthermore, the shaft cover 63 has, at its left side, an inverted U-shaped portion 62*a* is formed, so that the inverted U-shaped portion 62*a* keeps the fitted state of the shaft 55 in the U-shaped supporting portion 61 with the T-shaped engaging portion 63*a* fitted in the vertical slit 62.

Figure 5:
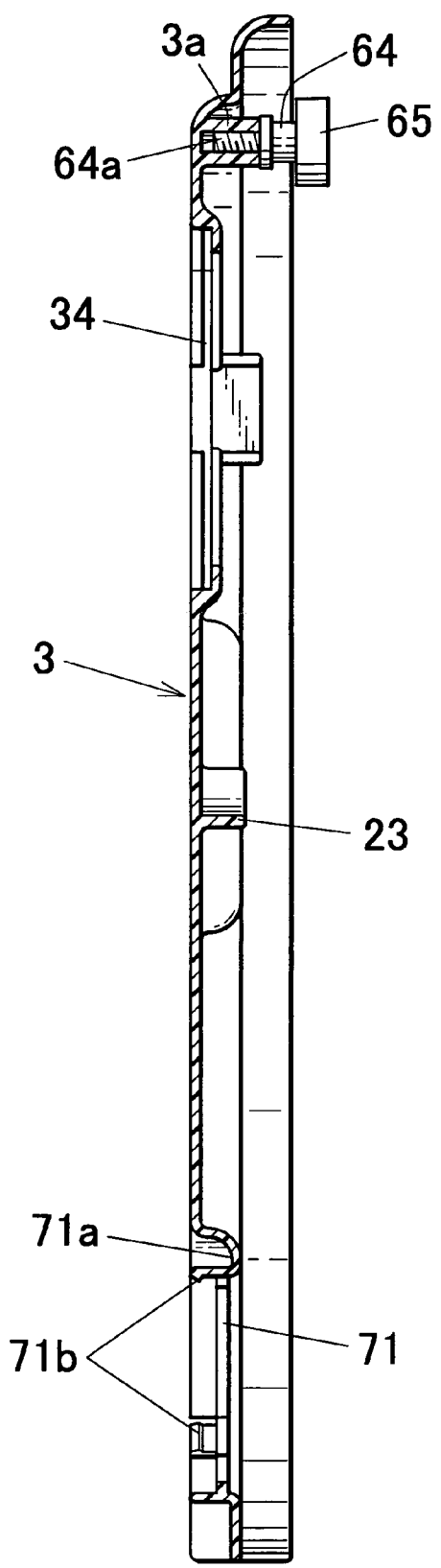
FIG. 5 is a cross-sectional view showing a fixing side plate of the housing.

As shown in FIGS. 3 and 5, at the inner upper portion of the fixing side plate 3, a roller shaft 64 is provided. On this roller shaft 64, a supporting roller 65 to be brought into contact with the internal peripheral surface of the left frame 51 of the wheel 5 is supported in a rotatable manner. The roller shaft 64 is fixed to a boss portion 3*a* protruded from the inner surface of the fixing side plate 3 by screwing a threaded portion 64*a* formed on the basal end portion of the roller shaft 64 into the boss portion 3*a*.

Thus, the activity wheel 5 is supported by the U-shaped supporting portion 23 of the fixing side plate 3, the U-shaped supporting portion 61 of the right bracket 14B and the supporting roller 65.

As shown in FIG. 2, the fixing side plate 3 is provided with a first connecting aperture 71 and a second connecting aperture 72. The first connecting aperture 71 is formed at a lower side of the fixing side plate 3 for detachably connecting an opened end portion 73*a* of a connecting tube 73 to which another breeding device or an external device is to be connected.

The second connecting aperture 72 is formed at approximately the same height as the second stage 41 for detachably connecting an opened end portion 74*a* of a passage tube 74. In this embodiment, the other end of the connecting tube 73 is closed, and the other opened end portion 74*b* of the passage tube 74 is in communication with the connecting tube 73 so that hamsters can move in the passage tube 74 and the connecting tube 73. However, the passage tube 74 can be detached from the connecting tube 73, and the other end thereof can be closed.

Figure 17:
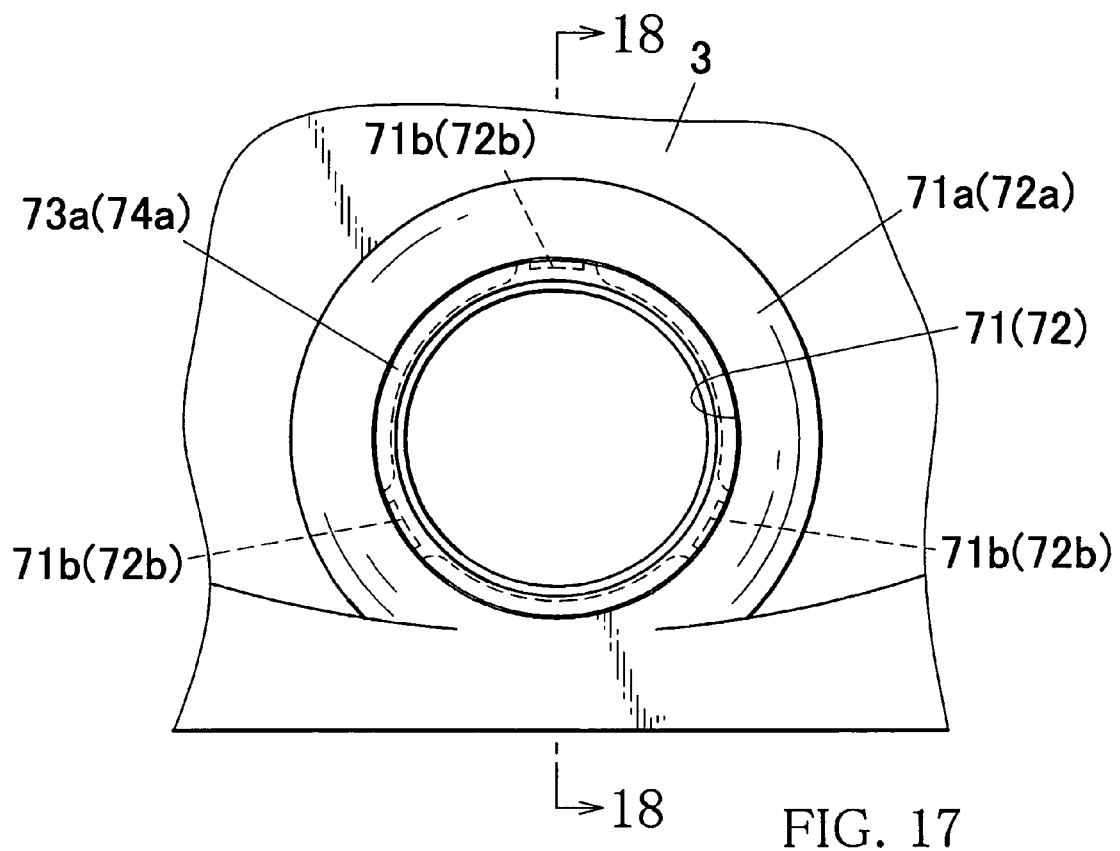
FIG. 17 is the first (second) connecting aperture formed in the fixing side plate as seen from the inside of the plate.
Figure 18:
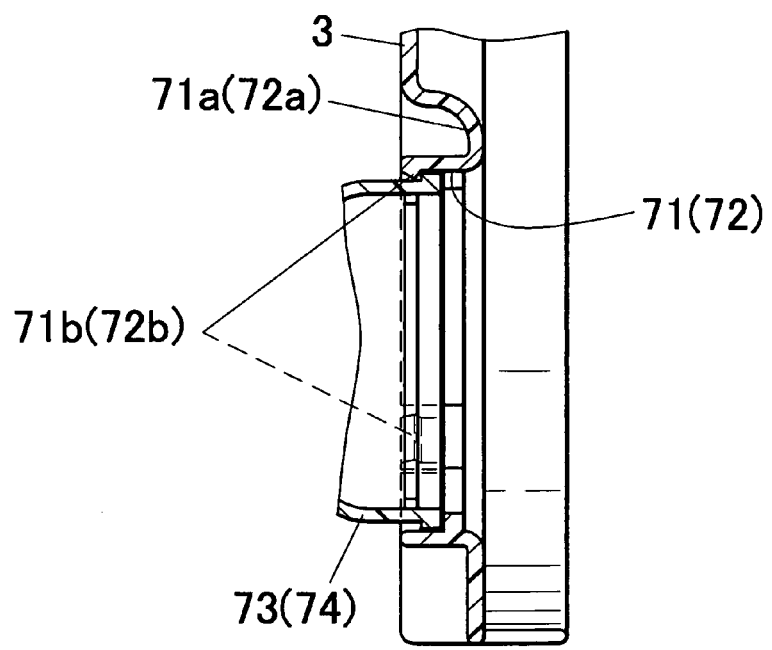
FIG. 18 is a cross-sectional view taken along the line 18-18 in FIG. 17.

The connection structure of the first (second) connecting aperture 71 (72) is shown in FIGS. 17 and 18. Plural inner peripheral portions 71*a* (72*a*) of the connecting aperture 71 (72) are formed into an inwardly protruded U-shape, respectively, so as to be elastically deformed. Each inner peripheral portion 71*a* (72*a*) is provided with a protrusion 71*b* (72*b*).

Thus, inserting into the first connecting aperture 71 (second connecting aperture 72), the opened end portion 73*a* (74*a*) of the connecting pipe 73 (passage pipe 74) is detachably engaged with the protrusions 71*b* ((72*b*).

Next, the assembling of the aforementioned housing for small pet animals will be explained.

The first step is to assemble the pedestal portion 1. Initially, each of the T-shaped connecting ledges 15 of the front and rear connecting members 13 is inserted into the corresponding vertical slit 16 of each of the right and left brackets 14A and 14B. Then, while keeping this assembled state, the right and left brackets 14A and 14B are built onto the right and left base members 11 and 11 such that the right and left pillars 12 are inserted into the opened lower ends of the right and left brackets 14A and 14B. The assembling order of this pedestal portion 1 is not limited to the above. Any preferable assembling order can be arbitrarily employed.

When the pedestal portion 1 is assembled, the right and left brackets 14A and 14B are fixed to the pedestal portion 1. At the same time, the fixing side plate 3 is fixed on the pedestal portion 1 via the left bracket 14A.

In a state in which the pillars 12 are inserted into the opened lower ends of the right and left brackets 14A and 14B, the tip protrusions of the elastic engaging ledges 18 of the pillars 12 are fitted in the corresponding apertures 14c of the brackets 14A and 14B, causing secure fixing of the brackets 14A and 14B to the pillars 12 (see FIG. 4).

Next, the housing equipments are attached to the fixing side plate 3. Initially, the pair of T-shaped hooks 41c and 41c formed at the left side of the first stage 41 is engaged with the T-shaped apertures 21 of the fixing side plate 3. Thus, the first stage 41 is supported at the inner side of the fixing side plate 3. Similarly, the pair of T-shaped hooks 42c and 42c formed at the left side of the second stage 42 is engaged with the T-shaped apertures 22 of the fixing side plate 3. Thus, the second stage 42 is supported at the inner side of the fixing side plate 3.

In this state, as shown in FIG. 12, the supporting ledge 41d is in contact with the inner surface of the fixing side plate 3 to secure the engaging state of the hook 41c by receiving the weight of the first stage 41. Thus, the first stage 41 is stably secured to the fixing side plate 3 to cope with hamsters' movements. As also shown in FIG. 12, the supporting ledge 42d of the second stage 42 is in contact with the inner surface of the fixing side plate 3 to secure the engaging state of the hook 42c by receiving the weight of the second stage 42. Thus, the second stage 42 is stably secured to the fixing side plate 3.

Prior to attaching the nest 44 to the first stage 41, the nest 43 is assembled.

The coupling operation of the nest main body 44 and the bottom member 45 causes the engagement of the elastic ledge 44d of the nest main body 44 to the dented portion 45d of the bottom member 45 (See FIG. 13). Thus, the assembling of the nest 43 is completed. In place of the above-structure, the dented portion 45d can be formed on the nest main body 44, and the elastic ledge 44d can be formed at the bottom member 45. Then, the assembled nest 43 is fitted in the nest fitting opening 41b of the first stage 41.

Furthermore, the feeder 47 can be assembled by fitting the feeding tray 46 in the aperture 42b as shown in FIG. 19.

The opened end portion 73a of the connecting tube 73 is forcibly inserted in the first connecting aperture 71 of the fixing side plate 3 to connect the connecting tube 73 to the fixing side plate 3. In this connected state, external various equipments can be connected to the cage 2 via the connecting tube 73.

Similarly, the opened end portion 74a of the passage tube 74 is forcibly inserted in the second connecting aperture 72 of the fixing side plate 3 to connect the passage tube 74 to the fixing side plate 3. In this connected state, hamsters can go in and out via this passage tube 74 and the connecting tube 73.

The attaching of the connecting tube 73 and the passage tube 74 can be performed after the assembling of the wheel 3.

Next, the right and left end portions of the cylindrical peripheral member 53 of the wheel 5 are forcibly inserted into the apertures 510 and 520 of the right and left frames 51 and 52 to thereby fabricate these three members 51, 52 and 53 into the wheel 5.

Then, the wheel 5 is disposed so that the left opened side thereof is covered by the fixing side plate 3. The left end portion 55a of the revolving shaft 55 is fitted in the U-shaped supporting portion 23 of the fixing side plate 3 and the right end portion 55b of the revolving shaft 55 is fitted in the U-shaped supporting portion 61 of the right bracket 14B. Then, the T-shaped engaging portion 63a of the shaft cover 63 is forcibly fitted in the vertical slit 62 of the upright wall 14a of the right bracket 14B. This prevents an unintended upward displacement of the revolving shaft 55.

Although the wheel 5 is formed to have an opened left side, since the axial width is relatively small, the wheel 5 can be stably rotated with the wheel 5 supported via the hub 550 of the right frame 52. In this example, since the supporting roller 65 inwardly protruded from the inside of the fixing side plate 3 is in contact with the inner peripheral surface of the left frame 51, the wheel 5 can be more stably supported at both axial end portions. As a result, even if the wheel 5 becomes larger in width and diameter, the stable supporting status of the wheel can be maintained.

Thus, the wheel 5 is rotatably supported above the pedestal portion 1, and a drum-shaped cage 2 accommodating the housing equipments 4 is formed.

In the housing assembled as mentioned above, by opening the first door 33 to open the opening 31, small pet animals such as hamsters can be put in the cage 2 via the opening 31. The hamsters can utilize the housing equipments 4 in the cage 2. For example, hamsters can take a nap or sleep in the nest 44 and run the wheel 5 anytime.

As mentioned above, the fixing side plate 3 and the wheel 3 with an opened side covered by the fixing side plate 3 constitute the drum-shaped cage 2, and almost all of housing equipments are placed at the inside of the fixing side plate 3. Therefore, the wheel 5 can be increased in diameter without sacrificing the size of housing equipments 4.

When the wheel 5 is rotated by hamsters, it appears that the cage 2 itself rotates, resulting in an impressive view. Furthermore, hamsters can exercise sufficiently in the wheel 5.

In this embodiment, since the housing equipments 4 are attached to the fixing side plate 3, the administration of the housing equipments 4 can be performed regardless of the rotation of the wheel 5. In other words, even if the wheel 5 is in a rotating status, foods can be supplied to the feeding tray 46 via the feeding opening 34 by opening the second door 36. Furthermore, by opening the second door 36, the nest 44 can be taken out to clean it, resulting in an easy administration.

Furthermore, since the first stage 41 is located near the lower opened end 37a of the water-feeder receptor 37, hamsters can easily move from the first stage 41 to the lower opened end 37a of the water-feeder receptor 37. Therefore, hamsters can drink water from the water outlet 39 of the water-feeder 38 held in the water-feeder receptor 37. The water refilling operation of the water-feeder 38 can be performed by detaching the water-feeder 38 from the receptor 37.

The toilet tray 19 can be easily cleaned by pulling out of the pedestal portion 1.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A housing for small pet animals, comprising:
a pedestal portion;
a fixing side plate uprightly fixedly attached to said pedestal portion;
an activity wheel with one side opened toward said fixing side plate and the other side closed by a closing member, said wheel being rotatably disposed above said pedestal portion with said one side closed by said fixing side plate; and
housing equipment immovably attached to said fixing side plate and disposed in a housing space surrounded by said fixing side plate and said activity wheel,
wherein said activity wheel includes a pair of side frames disposed in parallel with each other at a certain distance, a cylindrical peripheral member disposed between said pair of side frames and connected thereto, and a revolving shaft supporting said activity wheel for revolution by a small pet animal placed therein, with one end portion thereof connected to one side of said pair of side frames.

2. The housing for small pet animals as recited in claim 1, wherein said cylindrical peripheral member is a net-shaped member.

3. The housing for small pet animals as recited in claim 1, wherein said cylindrical peripheral member is a lattice-shaped member.

4. The housing for small pet animals are recited in claim 1, wherein one of said pair of side frames includes a circular peripheral rim, radially extending spokes, and transparent members for closing openings surrounded by said peripheral rim and said spokes.

5. The housing for small pet animals as recited in claim 1, wherein said wheel is provided with a revolving shaft with one end portion thereof rotatably supported by said fixing side plate and the other end portion thereof rotatably supported by a wheel supporting stand attached to said pedestal portion.

6. The housing for small pet animals as recited in claim 5, further comprising a support roller inwardly protruded from said fixing side plate so as to be brought into contact with an inner peripheral surface of said wheel.

7. The housing for small pet animals as recited in claim 1, wherein said fixing side plate is provided with a first opening for connecting a connecting tube to be disposed at an outside of said housing.

8. The housing for small pet animals as recited in claim 1, wherein said fixing side plate is provided with a second opening for connecting a passage tube to be disposed at an outside of said housing.

9. The housing for small pet animals as recited in claim 1, wherein said pedestal portion is provided with a slidable tray.

10. The housing for small pet animals as recited in claim 1, wherein said housing equipment is a stage on which breeding equipments are to be disposed.

11. The housing for small pet animals as recited in claim 10, wherein said stage is provided with hooks to be engaged with hooking apertures formed in said fixing side plate and supporting ledges to be brought into contact with an inner surface of said fixing side plate in a state in which said supporting ledges are engaged with said hooking apertures.

12. A housing for small pet animals, comprising:
a drum-shaped rotatable main housing with one opened side, including a pair of side frames disposed in parallel with each other at a certain distance, a cylindrical peripheral member disposed between said pair of side frames and connected thereto, and a revolving shaft with one end portion thereof connected to one of said pair of said side frames, supporting said drum-shaped rotatable main housing for revolution by a small pet animal placed therein;
a vertical side member closing said one opened side of said drum-shaped main housing and being stationary relative to said drum-shaped rotatable housing; and
housing equipment immovably attached to an inside surface of said side member,
whereby said drum-shaped rotatable main housing is capable of being rotated about a horizontal axis thereof by small pet animals.

13. The housing for small pet animals as recited in claim 12, wherein one of said pair of side frames includes a circular peripheral rim, radially extending spokes, and transparent members for closing openings surrounded by said peripheral rim and said spokes.

14. The housing for small pet animals as recited in claim 12, wherein said drum-shaped rotatable main housing is provided with a revolving shaft with one end portion thereof rotatably supported by said vertical side member and the other end portion thereof rotatably supported by a wheel supporting stand.

15. The housing for small pet animals as recited in claim 12, further comprising a supported roller inwardly protruded from said vertical side member so as to be brought into contact with an inner peripheral surface of said drum-shaped rotatable main housing.

16. The housing for small pet animals as recited in claim 12, wherein said vertical side member is provided with a first opening for connecting a connecting tube to be disposed at an outside of said housing.

17. The housing for small pet animals as recited in claim 12, wherein said fixing side plate is provided with a second opening for connecting a passage tube to be disposed at an outside of said housing.

* * * * *